(12) United States Patent
Tanaka et al.

(10) Patent No.: US 7,227,746 B2
(45) Date of Patent: Jun. 5, 2007

(54) STORAGE SYSTEM

(75) Inventors: Katsuya Tanaka, Kokubunji (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 11/288,179

(22) Filed: Nov. 29, 2005

(65) Prior Publication Data

US 2007/0064383 A1 Mar. 22, 2007

(30) Foreign Application Priority Data

Sep. 22, 2005 (JP) .............................. 2005-275025

(51) Int. Cl.
G06F 1/16 (2006.01)
H05K 7/00 (2006.01)

(52) U.S. Cl. ...................... 361/685; 713/323; 725/142; 386/95

(58) Field of Classification Search .................... 713/1, 713/320, 323; 725/134, 142; 710/306; 361/679–687, 361/724–727; 386/645, 52, 95
See application file for complete search history.

(56) References Cited

U.S. PATENT DOCUMENTS

2003/0063966 A1 4/2003 Apple et al.
2004/0225827 A1* 11/2004 Yokota et al. .............. 711/103
2006/0050487 A1* 3/2006 Wu et al. ................... 361/724
2006/0262677 A1* 11/2006 Willrich .................. 369/44.11

FOREIGN PATENT DOCUMENTS

JP 07-230362 8/1995
JP 08-102179 4/1996

* cited by examiner

Primary Examiner—Hung Van Duong
(74) Attorney, Agent, or Firm—Mattingly, Stanger, Malur & Brundidge, P.C.

(57) ABSTRACT

In a storage system that includes multiple disk drives, the disk drive packaging density is increased, and maintainability and serviceability, as well as cooling performance, are improved. The storage system includes multiple racks, multiple disk drives and multiple cooling devices. The multiple racks are arranged to form a substantially polygonal cylinder-shaped central space used to enable maintenance work to be carried out. Furthermore, an entrance area for a worker to enter the central space is formed between a first rack and a second rack among the multiple racks. The multiple disk drives are detachably mounted to one side of inside and outside of the multiple racks, and are arranged to form a first surface in each of the multiple racks. The multiple cooling devices are arranged to form a second surface in each of the multiple racks. The second surface is substantially parallel to the first surface.

19 Claims, 11 Drawing Sheets

STORAGE SYSTEM

CROSS REFERENCE TO RELATED APPLICATIONS

This application relates to and claims priority from Japanese Patent Application No.2005-275025, filed on Sep. 22, 2005, the entire disclosure of which is incorporated by reference.

BACKGROUND

1. Technical Field

The present invention relates to a storage system, and more particularly to a storage system that includes multiple disk drives.

2. Description of the Related Art

Storage systems that include multiple disk drives are known in the art as secondary storage systems connected to one or more computers. In recent years, there has been a trend toward increasing the storage capacities of such storage systems by including a large number of disk drives. For example, one key type of storage system for storing large amounts of data uses so-called MAID (Massive Arrays of Idle Disks) technology. In a storage system that employs MAID technology, there may be approximately 1000 disk drives for each storage system, enabling the storage of extremely large amounts of data. At the same time, when MAID technology is used, power consumption can be reduced and the useful life of the disk drives extended by limiting the number of simultaneously operating disk drives included in the storage system (to ¼ of such drives, for example).

In this type of system, a technology in which a large number of disk drives are housed in the three-dimensional fashion in a chassis is known. In this technology, improvements have been made in both the packaging density of the drives and the ease of maintenance and servicing.

However, in the above prior art technology, the disk drives arranged in a number of vertical tiers are cooled by a common cooling fan disposed at the top of the chassis. As a result, there is a danger that the drives at the lower tiers that are located some distance from the cooling fan cannot be sufficiently cooled.

SUMMARY

An advantage of some aspects of the invention is to provide a storage system including multiple disk drives that offers high disk drive packaging density, good maintainability and serviceability and high cooling performance.

In order to address at least a part of the above problem, a first aspect of the invention provides a storage system. The storage system pertaining to the first aspect of the invention comprises multiple racks, multiple disk drives and multiple cooling devices. The multiple racks are arranged to form a substantially polygonal cylinder-shaped central space and have an entrance area. Each of the multiple racks has an inside and an outside. The central space is used to enable maintenance work to be carried out. The entrance area for a worker to enter the central space is formed between a first rack and a second rack among the multiple racks. The multiple disk drives are detachably mounted to one side of the inside and the outside of the multiple racks. And the multiple disk drives are arranged to form a first surface of each of the multiple racks. The multiple cooling devices are arranged to form a second surface of each of the multiple racks. The second surface is substantially parallel to the first surface.

According to the storage system pertaining to the first aspect, because the multiple racks are arranged to form a substantially polygonal cylinder-shaped central space used for maintenance work, a high packaging density can be obtained while preserving an area to be used for maintenance work. Furthermore, because the cooling devices are arranged to form a second surface that is substantially parallel to the disk drives arranged to form a first surface in each of the multiple racks, cooling performance can be improved.

In order to address at least a part of the problem described above, a second aspect of the invention provides a storage system. The storage system pertaining to the second aspect comprises multiple racks, multiple first disk drives, multiple second disk drives, multiple doors and multiple cooling devices. The multiple racks are arranged to form a substantially polygonal cylinder-shaped central space and have an entrance area. Each of the multiple racks has an inside and an outside. The central space is used to enable maintenance work to be carried out. The entrance area for a worker to enter the central space is formed between a first rack and a second rack among the multiple racks. The first disk drives are detachably mounted to the inside of the multiple racks. The first disk drives are also arranged to form an inner surface of each of the multiple racks. The second disk drives are detachably mounted to the outside of the multiple racks. The second disk drives are also arranged to form an outer surface of each of the multiple racks. The multiple doors are each mounted to one side of the inside and the outside of each of the multiple racks. The multiple doors are openable and closable. When being closed, each of the multiple doors faces and substantially parallel to a mount-side-surface. The mount-side-surface is a surface of the one side to which the door is mounted among the inner surface and the outer surface of the rack. The multiple cooling devices are arranged to form a door-surface of each of the multiple doors. The door-surface is a surface facing and substantially parallel to the mount-side-surface when the door being closed.

According to the storage system pertaining to the second aspect, because the multiple racks are arranged to form a substantially polygonal cylinder-shaped central space used to enable maintenance work to be carried out, a high packaging density may be obtained while preserving an area to be used for maintenance work. Furthermore, because the first and second disk drives are arranged to form the inner surfaces and outer surfaces of the racks, and the cooling devices are arranged to form surfaces of the doors that face the inner or outer surfaces in a substantially parallel fashion when closed, disk drive cooling performance is increased. Moreover, because the doors are mounted so as to be openable and closable, the worker can easily perform maintenance work even to disk drives that are arranged to form the surface of the side on which the doors are mounted.

The above and other objects, characterizing features, aspects and advantages of the present invention will be clear from the description of preferred embodiments presented below along with the attached figures.

DETAILED DESCRIPTION OF THE PREFERRED EMBODIMENTS

Embodiments of the present invention will be described below with reference to the drawings based on examples.

A. First Embodiment

A-1. Construction of Storage System

Figure 1:
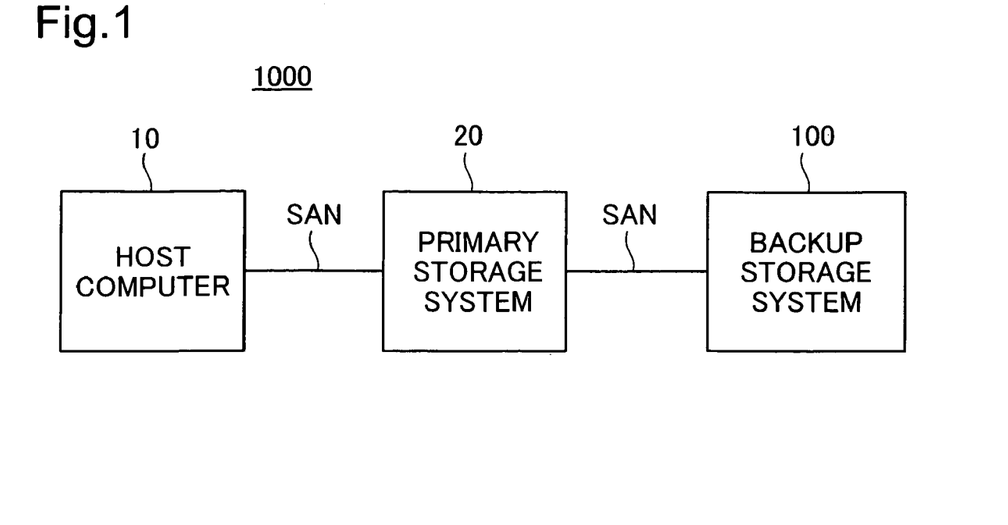
FIG. 1 shows a schematic of one example of the arrangement of a computer system including the storage system pertaining to a first embodiment.
Figure 2:
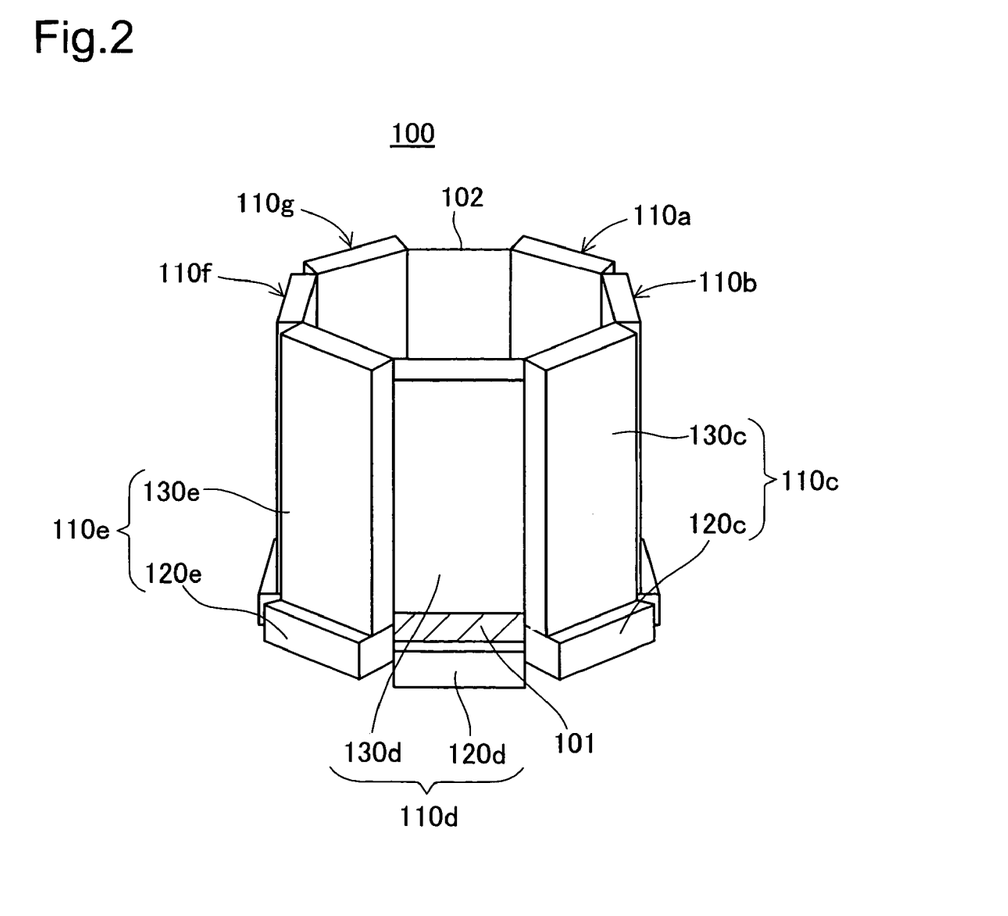
FIG. 2 shows a perspective view of the external appearance of the storage system pertaining to the first embodiment.
Figure 3:
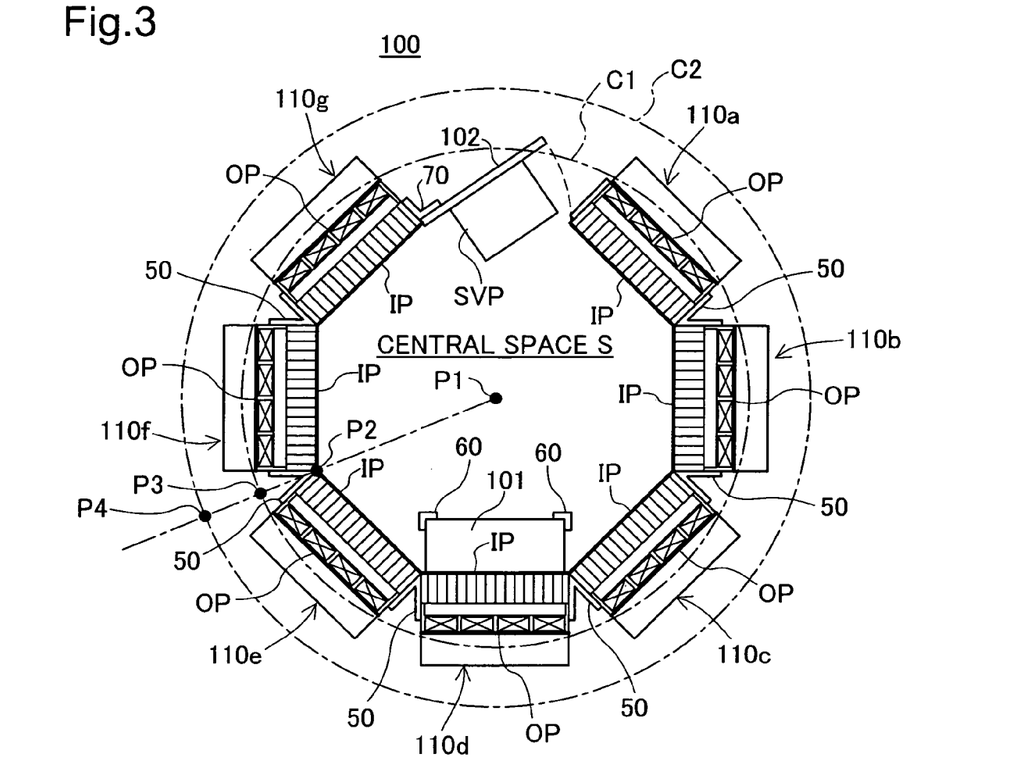
FIG. 3 shows a cross-sectional view of the storage system pertaining to the first embodiment cut along a plane parallel to the installation surface.

The basic construction of the storage system pertaining to a first embodiment will now be described with reference to FIGS. 1–3. FIG. 1 shows a schematic of one example of the arrangement of a computer system including the storage system pertaining to a first embodiment. FIG. 2 shows a perspective view of the external appearance of the storage system pertaining to the first embodiment. FIG. 3 shows a cross-sectional view of the storage system pertaining to the first embodiment cut along a plane parallel to the installation surface.

The computer system 1000 shown in FIG. 1 includes a host computer 10, a primary storage system 20 and a backup storage system 100. The host computer 10 and primary storage system 20 are communicably connected over a SAN (Storage Area Network). Similarly, the primary storage system 20 and the backup storage system 100 are communicably connected over a SAN. The host computer 10 uses the primary storage system 20 as a secondary storage device to store data such as the results of computation. The primary storage system 20 regularly stores in the backup storage system 100 backup data for the data stored therein.

In order to provide storage of several generations of backup data, the storage system 100 includes a storage area that has a much larger capacity than the primary storage system 20. As a result, the storage system 100 of this embodiment includes over 1000 hard disk drives as described below. The storage system 100 will be described in detail below.

As shown in FIG. 2, the storage system 100 has a substantially polygonal cylinder-shaped external configuration that rises substantially vertically from the installation surface. As shown in FIG. 3, as seen from above, the storage system 100 has the basic configuration of a regular polygon. In the example shown in FIG. 2, the storage system 100 includes seven racks 110a–110g. Each of the seven racks 110a–110g has an inner surface IP and an outer surface OP. The seven racks 110a–110g are arranged in a substantially octagonal configuration with their respective inner surfaces IP on the inside. As a result, a central space S is formed by the inner surfaces IP. Furthermore, two adjacent racks among the seven racks 110a–110g, such as the racks 110a, 110b for example, are connected at their edges by a connecting member 50. The connecting member 50 comprises a hinge, for example. The hinge can freely adjust the angle of connection of the two connected racks. Therefore, the number of racks can be easily increased or decreased as necessary. For example, the number of racks in the example shown in FIG. 1 can be increased by one to create an enneagonal cylinder. Alternatively, the number of racks may be decreased by one to form a heptagonal cylinder.

The central space S is a space used to enable a worker to perform maintenance work. An ingress/egress opening that enables the worker to enter the central space S is formed between the racks 110a, 110g among the seven racks 110a–110g. This ingress/egress opening can be opened and closed via an entrance/exit door 102 mounted to the edge of the rack 110g via a hinge 70. A maintenance terminal SVP belonging to the storage system 100 is disposed on the central space S side of the entrance/exit door 102.

The seven racks 110a–110g each include a disk drive section and a power supply section. For example, as shown in FIG. 2, the rack 110c includes a disk drive section 130c and a power supply section 120c. The racks 110a–110g each have an identical construction, except that a control unit 101 is housed in a part of the disk drive section 130d of the rack 110d. Therefore, in the description below, where it is not necessary to distinguish among the various racks 110a–110g, the letter at the end of the identifying number will be omitted, and the rack will be referred to simply by the number '110'. The same designation method will also be used for the disk drive sections 130a–130g and power supply sections 120a–120g included in the racks 110a–110g.

The disk drive section 130 has the external appearance of a substantially square cylinder whose horizontal cross-sectional configuration parallel to the installation surface is rectangular and that extends upward substantially perpendicular to the installation surface. The power supply section 120 is disposed below the disk drive section 130. The disk drive section 130 and power supply section 120 may be formed as a single component or as separate components.

The control unit 101 is housed in an enclosure (described below) positioned at the bottom part of the disk drive section 130 of the rack 110d. Where the depth of the controller unit 101 is larger than the depth of the rack 110d, the controller unit 101 may protrude into the central space S as shown in FIG. 3. In this case, a support post 60 that supports the controller unit 101 may be used if necessary.

Figure 4:
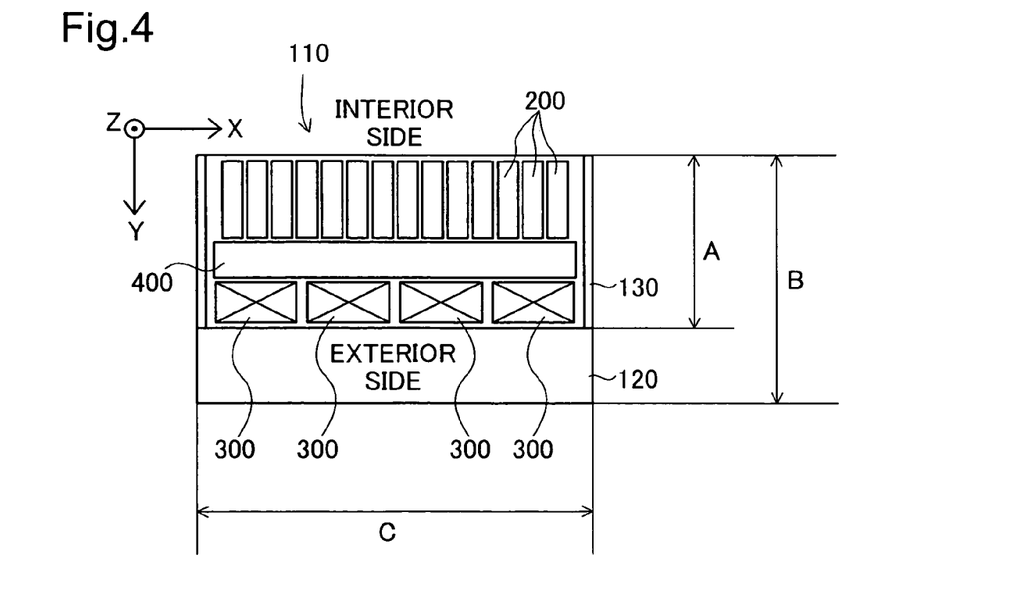
FIG. 4 shows an expanded cross-sectional view of one rack 110 shown in the cross-sectional view of FIG. 3.
Figure 5:
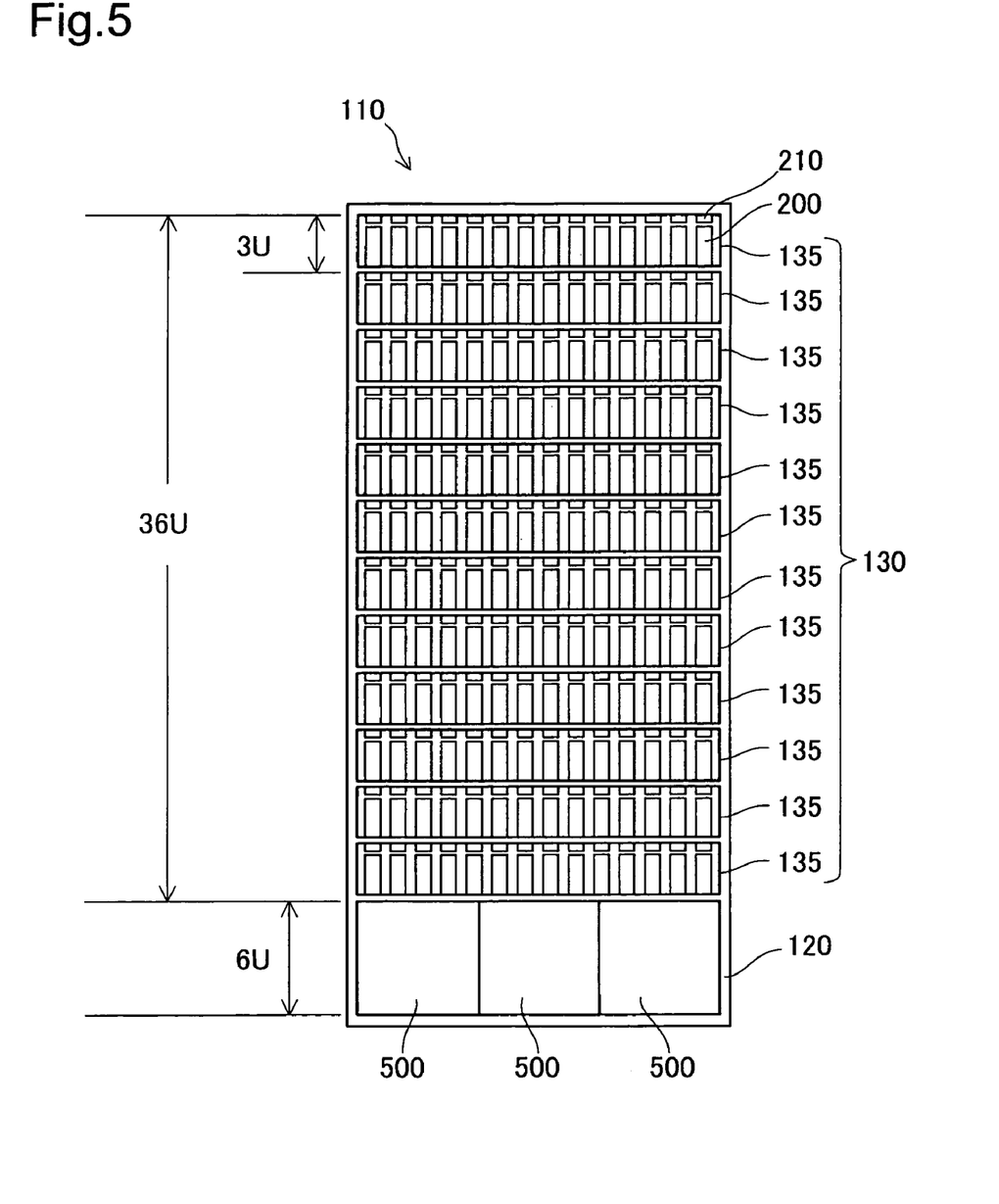
FIG. 5 shows a first side view of a rack 110 seen from the inside.
Figure 6:
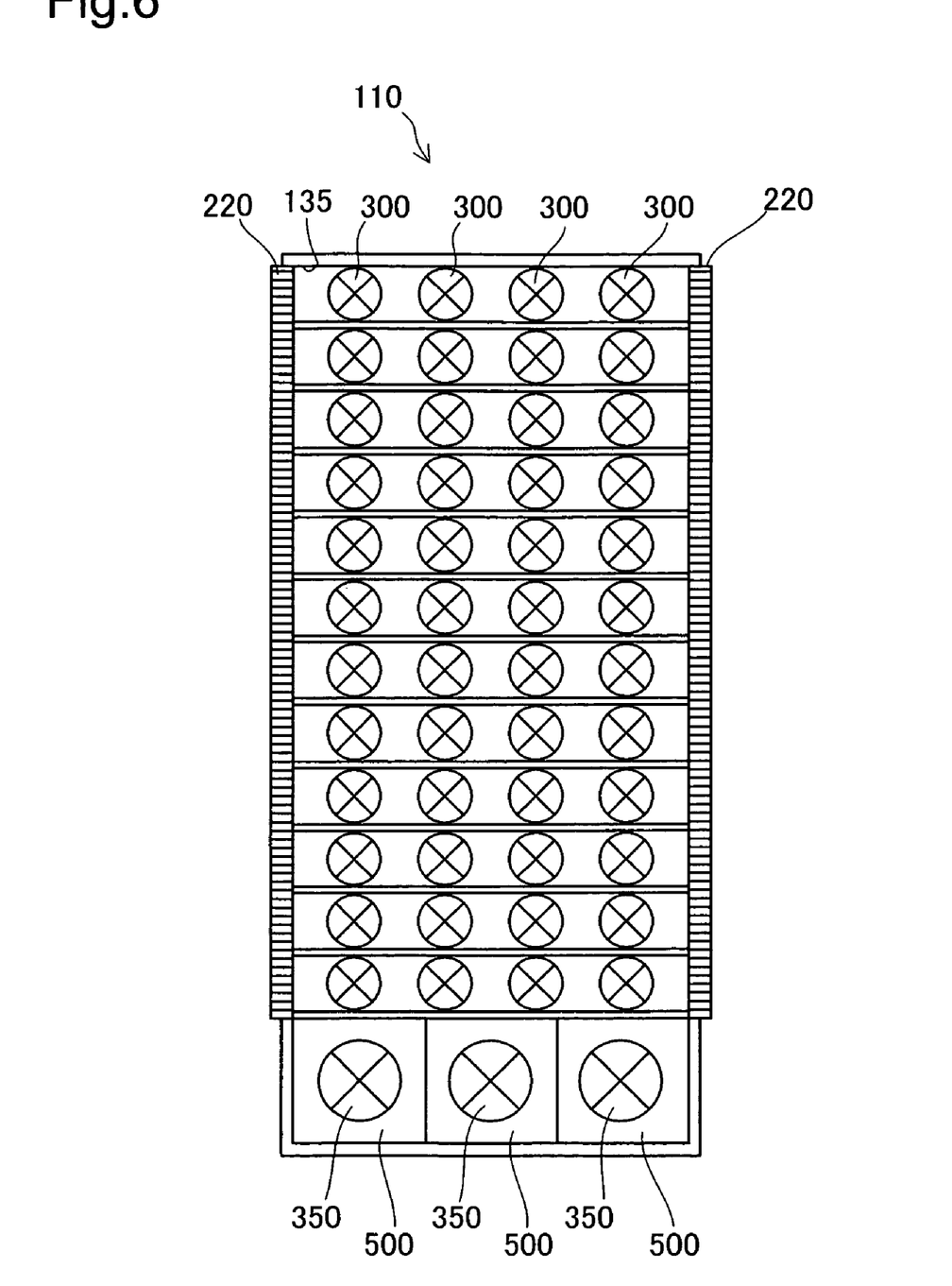
FIG. 6 shows a second side view of a rack 110 seen from the outside.

The construction of the racks 110 will now be described with reference to FIGS. 4–6. FIG. 4 shows an expanded cross-sectional view of one rack 110 shown in the cross-sectional view of FIG. 3. FIG. 5 shows a first side view of a rack 110 seen from the inside. FIG. 6 shows a second side view of a rack 110 seen from the outside.

A wiring board 400 is disposed inside the disk drive section 130 of the rack 110 in substantially the center of the depth-wise direction therein (i.e., the direction of the Y-axis in FIG. 4) such that it rises vertically relative to the depth-wise direction and substantially parallel to the height-wise direction (i.e., the direction of the Z-axis in FIG. 4) and the widthwise direction (i.e., the direction of the X-axis in FIG. 4) therein.

The disk drive section 130 of the rack 110 contains many tiers of enclosures 135. In the example shown in FIG. 5, there are twelve tiers of enclosures 135 in the height-wise direction, each of which has a height of roughly 3U. Here, 'U' is a unit of measurement used in order to express the size of a rack, and 1U represents 44.45 mm (millimeters). Each enclosure 135 can house 14 disk drives 200 arranged in the widthwise direction (see FIGS. 4, 5).

Each disk drive 200 is detachably housed in an enclosure 135. When a disk drive 200 is housed in a enclosure 135, disk drive 200 is electrically connected to the wiring board 400 via a connector disposed on the back surface of the disk drive 200 and thereby becomes derivable. As seen from above, each disk drive 200 housed in an enclosure 135 is arranged along and on the interior side of the wiring board 400 (see FIG. 4). Here, the interior side is deemed to mean the central space S side, while the exterior side is deemed to mean the side opposite the central space S side. As a result of this arrangement, the disk drives 200 are exposed on the interior side of the rack 110 and form a part of the inner surface IP of the rack 110.

In each rack 110, four cooling fans 300 are disposed along the widthwise direction for each enclosure 135. In the example shown in FIG. 6, sets of four cooling fans 300 are arranged in 12 layers along the height of the rack 110. Each cooling fan 300 is electrically connected to the wiring board 400 and can be driven. As seen from above, the cooling fans 300 are arranged along the exterior side of the wiring board 400 (FIG. 4). As a result of this arrangement, the cooling fans 300 are exposed on the exterior side of the rack 110 and form a part of the outer surface OP of the rack 110. The wiring board 400 has sufficient holes or gaps to allow the cooling air that is generated by the cooling fans 300 to pass through. Therefore, the cooling fans 300 are able to cool the disk drives 200 disposed opposite the cooling fans 300 on the other side of the wiring board 400.

The power supply section 120 of each rack 110 has a height of approximately 6U, and houses three power supplies 500 (see FIG. 5). In addition, cooling fans 350 that cool the various power supplies 500 are arranged in the power supply sections 120 on the exterior sides of the power supplies 500. The power supplies 500 are power supplies that can each supply over 500 W (watts) of power. The power output from each power supply 500 is supplied to the disk drives 200 housed in the disk drive section 130 and to the cooling fans 300, 350. In the rack 110d that houses the controller unit 101, the power output from the power supplies 500 is also supplied to the controller unit 101.

In addition, access LEDs 210 and 220 that indicate the activity of each disk drive 200 are mounted on the interior side and the exterior side of each rack 110. The interior side access LEDs 210 are arranged on the enclosures 135 as shown in FIG. 5. The exterior side access LEDs 220 are arranged along either edge of the cooling fans 300 as shown in FIG. 6. In this way, the activity of the disk drives 200 can be monitored from both the interior and the exterior sides of the storage system 100.

The size of the racks 110 will now be explained in a simple fashion. The depth-wise dimension A of the disk drive section 130 is approximately 250 mm. The depth-wise dimension B of the power supply section 120 is approximately 300 mm. The widthwise dimension C of the disk drive section 130 and the power supply section 120 is approximately 500 mm. The depth-wise dimension B of the power supply section 120 is larger than the depth-wise dimension A of the disk drive section 130, and the power supply section 120 extends outward beyond the disk drive section 130 to that extent (see FIG. 4). In the storage system 100, this protrusion of the power supply section 120 is not essential. By using more compact power supply devices, the depth-wise dimension B of the power supply section 120 can be made equal to or smaller than the depth-wise dimension A of the disk drive section 130. In this way, a construction may be adopted in which the power supply section 120 does not extend outward beyond the disk drive section 130. The height of the rack 110 is approximately 42U or approximately 1870 mm, as shown in FIG. 5.

As can be seen from the above explanation, the number of disk drives 200 per rack 110 equals 14×12, that is, 168. Therefore, the entire storage system 100 houses (168×7)−14, that is, 1162 disk drives 200. The subtraction of 14 in this calculation reflects the fact that the controller unit 101 is housed in the bottom most enclosure 135 of the rack 110d instead of a row of 14 disk drives 200.

If it is assumed that ¼ of the disk drives 200 belonging to the 168 disk drives of a given rack 110 operates at any given time, the power consumption of the disk drives 200 per rack 110 is approximately 840 W. Because the racks 110 of this embodiment each contain three power supplies 500 each having an output of 500 W, even if one power supply fails, the remaining two power supplies 500 can drive the disk drives 200.

Figure 7:
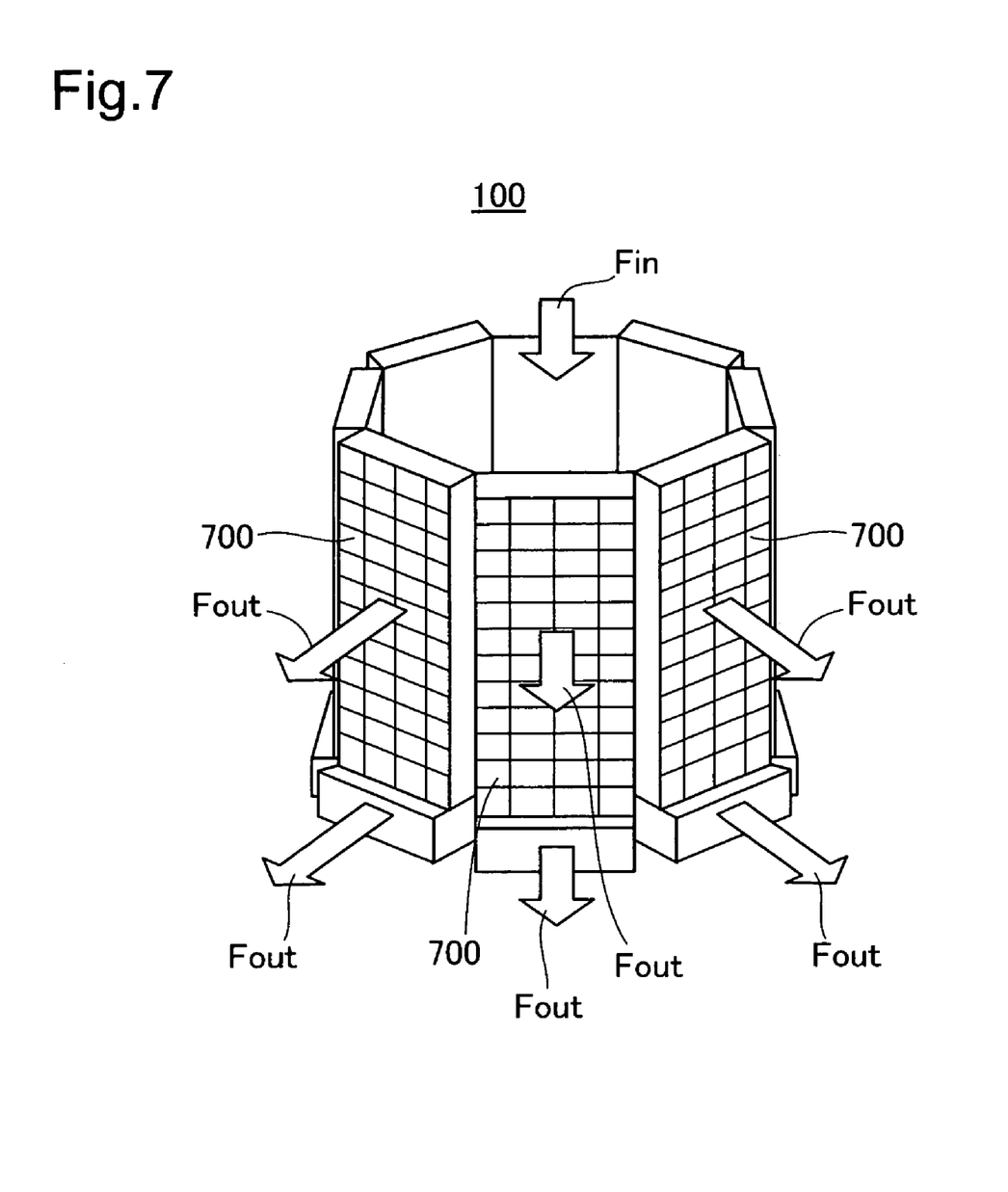
FIG. 7 shows a schematic showing the directions of air flow for cooling in the storage system.

FIG. 7 shows a schematic showing the directions of air flow for cooling in the storage system. In the storage system 100 shown in FIG. 7, a protective cover 700 that permits good air flow there through is mounted to the outer surface OP of each rack 110. In addition, it is preferred that each protective cover 700 be constructed so as to enable the access LEDs 220 to be seen from the outside. For example, the protective cover 700 is formed from a transparent or translucent material. The cooling fans 300, 350 for each rack 110 draw air from the central space S and transform it into a cooling air flow that travels through the gaps between the disk drives 200 and the power supplies 500. This cooling air flow travels through the gaps between the disk drives 200 and the power supplies 500 as shown by the arrows Fout in FIG. 7, whereupon it is expelled outside the rack 110 via the cooling fans 300, 350 and the protective covers 700. Because the air inside the central space S is expelled outward as cooling air, air flows into the central space S via the opening at the top of the storage system 100 formed above the central space S, as shown by the arrow Fin in FIG. 7.

Figure 8:
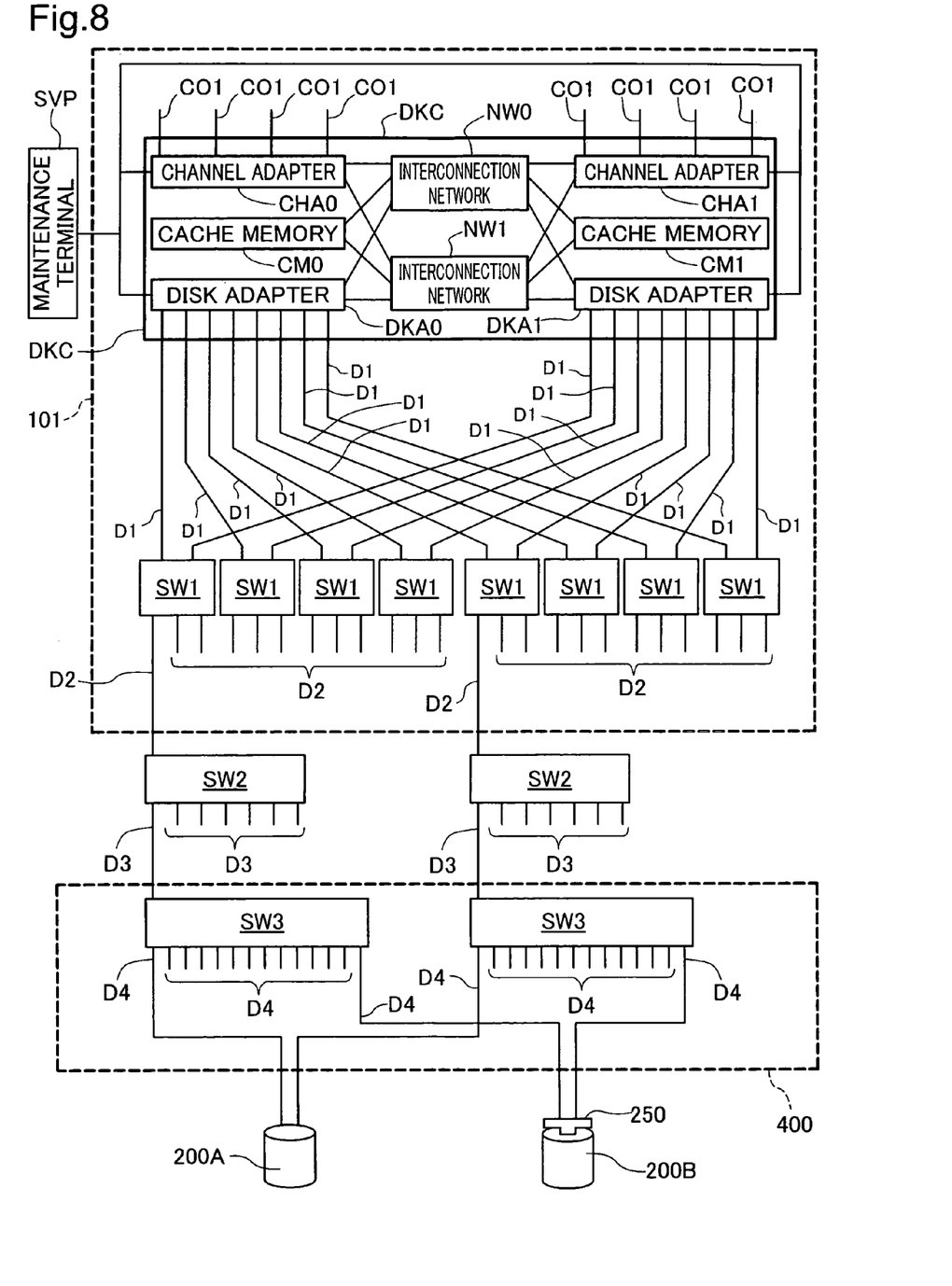
FIG. 8 shows a simplified schematic of the functional construction of the storage system.

The functional construction of the storage system 100 will finally be described with reference to FIG. 8. FIG. 8 shows a simplified schematic of the functional construction of the storage system. The storage system 100 includes a disk controller DKC in the interior of the controller unit 101. The disk controller DKC includes channel adapters CHA0, CHA1, cache memories CM0, CM1, disk adapters DKA0, DKA1 and interconnection networks NW0, NW1. The channel adapter CHA0, cache memory CM0 and disk adapter DKA0 are communicably interconnected via the interconnection networks NW0, NW1. The channel adapter CHA0 is connected to an external device (in the system construction shown in FIG. 1, the primary storage system 20, for example) via all or some of multiple external channels CO1. Similarly, the channel adapter CHA1, cache memory CM1 and disk adapter DKA1 are communicably interconnected via the interconnection networks NW0, NW1, and the channel adapter CHA1 is connected to an external device via all or some of the multiple external channels CO1.

The disk adapters DKA0, DKA1 are connected to each of the disk drives 200 described above via three types of switches and four types of connection channels. For example, FIG. 8 shows a situation in which the disk adapter DKA0 and the disk drive 200A are connected via a first connection channel D1, a first switch SW1, a second connection channel D2, a second switch SW2, a third connection channel D3, a third switch SW3 and a fourth connection channel D4. The disk adapters DKA0, DKA1 can access all of the disk drives 200 housed in the storage system 100 by switching of the first through third switches. Specifically, first, the disk adapters DKA0, DKA1 switch the first switches SW1 based on the position in the height-wise direction of the enclosure 135 that stores the disk drive 200 to which a connection is to be made. A second connection channel D2 corresponding to one of the tiers of the enclosures 135 disposed in 12 tiers in the height-wise direction is selected from among 24 second connection channels D2 by first switches SW1. There are 24 second channels D2 for the 12 tiers in order to increase the redundancy of the connections between each disk adapter DKA0, DKA1 and each disk drive 200 by ensuring that two connection channels D2 exist for each tier.

Similarly, the disk adapters DKA0, DKA1 switch a second switch SW2 to the rack 110 containing the enclosure 135 that houses the disk drive 200 to which a connection is to be made. A second switch SW2 exists for each second connection channel D2 (i.e., there are 12×2=24 second switches), but to conserve space, only two second switches SW2 are shown in FIG. 8. For each second switch SW2, there are a number of third connection channels D3 corresponding to the number of racks (in this embodiment, 7) such that any one of them can be selected. In FIG. 8, only the seven third connection channels D3 that may be selected by the two second switches SW2 are shown. In addition. The disk adapters DKA0, DKA1 switch the third switches SW3 that exist for each third connection channel D3 (here, 24×7=168 switches SW3) based on the position within the enclosure 135 of the disk drive 200 to which a connection is to be made. FIG. 8 shows only two of these third switches SW3. For each of these third switches SW3, there are a number of fourth connection channels D4 corresponding to the number of disk drives 200 in each enclosure 135 (in this embodiment, 14) such that any one of them may be selected. The first switches SW1 are incorporated inside the controller unit 101. The second switches SW2 are disposed near the enclosures 135 of the rack 110d that stores the controller unit 101. The third switches SW3 are disposed on the wiring board 400 of each enclosure 135.

The first through third switches are SAS (Serial Attached SCSI) expander switches, for example. The disk adapters DKA0, DKA1 are connected to a SAS disk drive 200A having two I/O ports via mutually different fourth connection channels D4. Furthermore, the disk adapters DKA0, DKA1 are connected to a SATA (Serial-ATA) disk drive that incorporates a port selector 250 via mutually different fourth connection channels D4. Moreover, the channel adapters CHA0, CHA1 and the disk adapters DKA0, DKA1 are connected to the maintenance terminal SVP. The disk controller DKC can input configuration information from the maintenance terminal SVP.

According to the storage system 100 having the above construction, the worker can easily replace the disk drives 200 from a position inside the central space S formed by the racks 110. Moreover, the worker can also easily replace the cooling fans from a position outside the storage system 100. In this way, the storage system 100 offers superior maintainability and serviceability.

Figure 9:
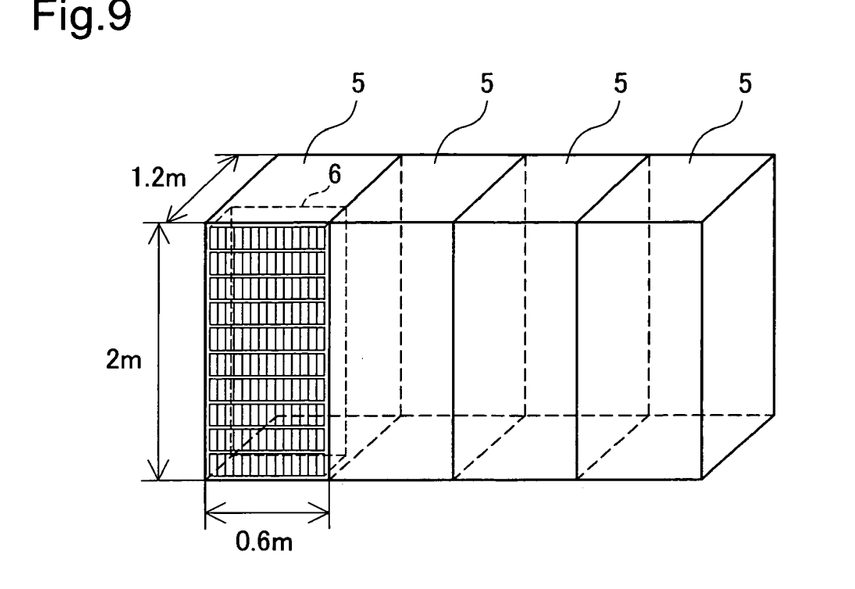
FIG. 9 shows a summary drawing of commonly used conventional racks.

The storage system 100 furthermore enables the packaging density of the disk drives 200 to be increased. FIG. 9 shows a summary drawing of commonly used conventional racks. The conventional rack 5 is a so-called 19-inch rack. The rack 5 has a width of 600 mm, a height of 2000 mm and a depth of 1200 mm. The disk drives are arranged along the widthwise direction of the racks 5 to form a single side surface. Because the area 6 in which the disk drive is housed has a depth of approximately 250 mm, if all that is required of the rack 5 is to house a disk drive, the depth thereof can be reduced. However, taking into account seismic resistance, in order to maintain the stability of a rectangular cylinder having a height of 2000 mm, a depth of 1200 mm is required.

Figure 10:
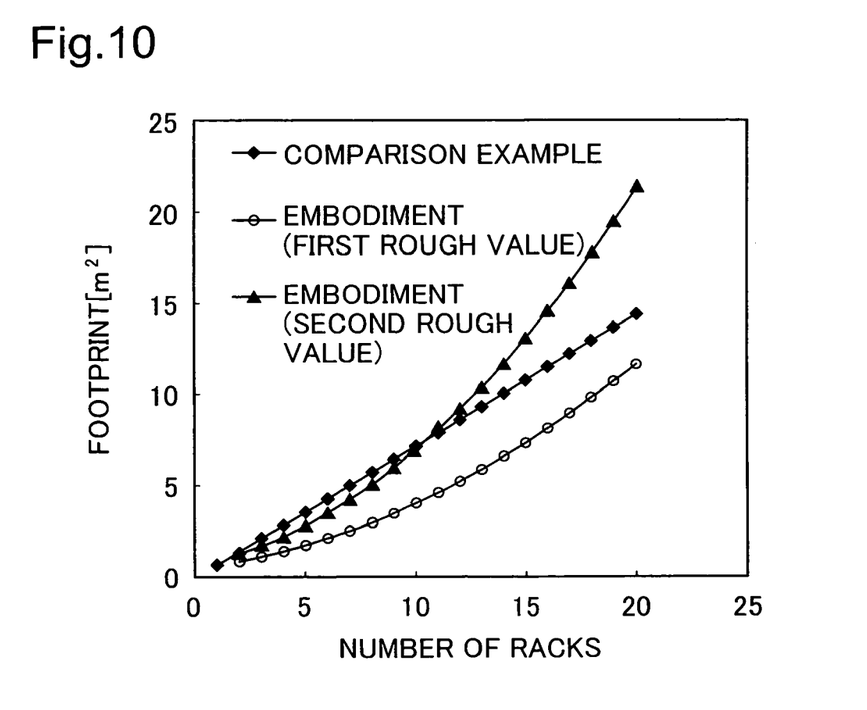
FIG. 10 shows a graph of the relationship between the footprint of a storage system and the number of multiple racks therein.

FIG. 10 shows a graph of the relationship between the footprint of a storage system and the number of multiple racks therein. In FIG. 10, the relationship between the footprint and the number of conventional racks shown in FIG. 9 is also shown for comparison purposes. In FIG. 10, first and second rough values for the footprint where the racks 110 of the embodiment are arranged in a substantially polygonal cylinder configuration are shown for various numbers of racks 110. Where there are (n) racks 110, the area of the circle C1 having a radius deemed to be a value comprising the distance between the center P1 and a vertex point P2 of a polygon having (n+1) sides where each side has a length of 500 mm, plus 250 mm, is used for the first rough value. For example, as shown in FIG. 3 for the case where there are seven racks, the regular polygon having (n+1) sides each having a length of 500 mm is equivalent to a polygon formed to have a horizontal cross-section defined by the inner surfaces IP. The 250 mm value that is added to the distance from the center P1 to a vertex P2 is equivalent to the depth-wise dimension of the racks 110 (see FIG. 5). The circle C1 where there are seven racks is shown in FIG. 3. The distance between the points P2 and P3 is 250 mm as described above. The second rough value is a value calculated using the same calculation method as that used for the first rough value where the length of one side of the regular polygon having (n+1) sides used for calculating is 700 mm instead of 500 mm. The area of the circle C2 shown in FIG. 3 is equivalent to the second rough value where there are seven racks 110. The circle C2 in FIG. 3 is a circle defined by the center point P1 and the point P4.

As can be seen from the graph of FIG. 10, where the number of racks ranges from 3 to 10, the footprint is smaller when the multiple racks 110 of this embodiment are used than where the racks of the prior art are used, i.e., the packaging density of the disk drives 200 is greater. The racks 110 of this embodiment have a short depth-wise dimension of 250 mm. However, by placing the multiple racks 110 in a polygonal cylinder configuration and interconnecting them via connecting members 50, the overall installation width of the storage system 100 can be maintained at a relatively higher value in any direction parallel to the installation surface. For example, the diameter of the circle C1 shown in FIG. 3 is approximately 1800 mm. Therefore, the storage system 100 pertaining to the embodiment can ensure adequate seismic resistance. Furthermore, housing the power supplies 500 in a power supply section 120 at a height different from that of the disk drive section 130 helps to keep the depth-wise dimension of the rack 110 small, which contributes to reducing the overall footprint.

Furthermore, because the storage system 100 pertaining to the embodiment is arranged such that the disk drives 200 and cooling fans 300 form substantially parallel surfaces of the rack 110, all disk drives 200 are adjacent to one of the cooling fans 300. For example, while in the disk device of prior art cited above has disk drives that are positioned at a distance from the cooling fans, this is not the case in the storage system 100 pertaining to the embodiment. Therefore, the cooling performance in regard to the disk drives 200 is improved.

B. Second Embodiment

Figure 11:
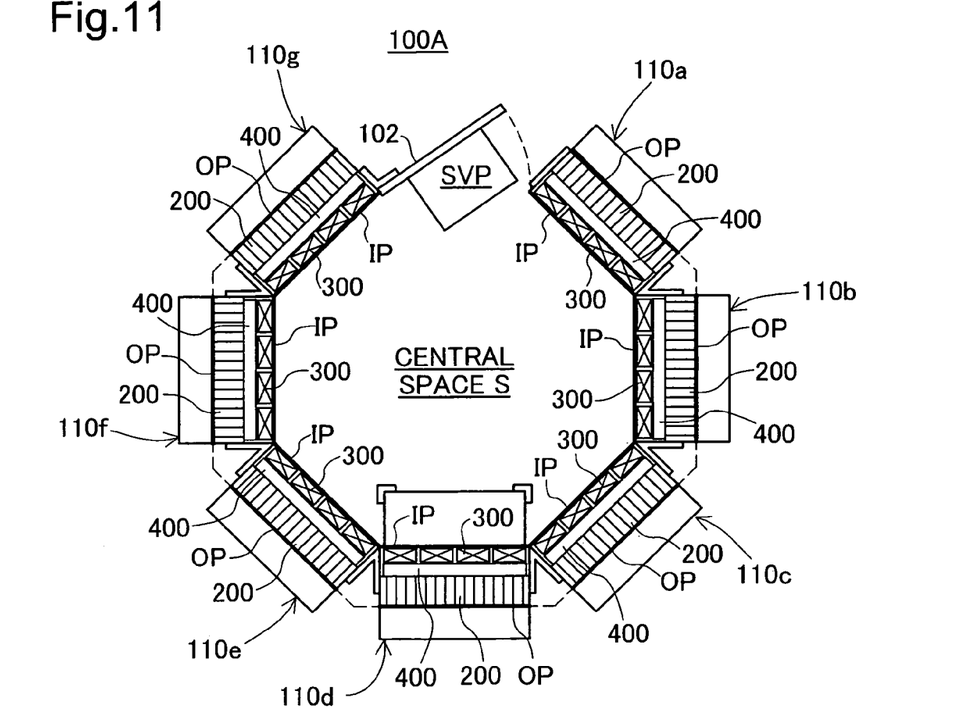
FIG. 11 shows a cross-sectional view of a storage system pertaining to the second embodiment cut along a plane parallel to the installation surface.
Figure 12:
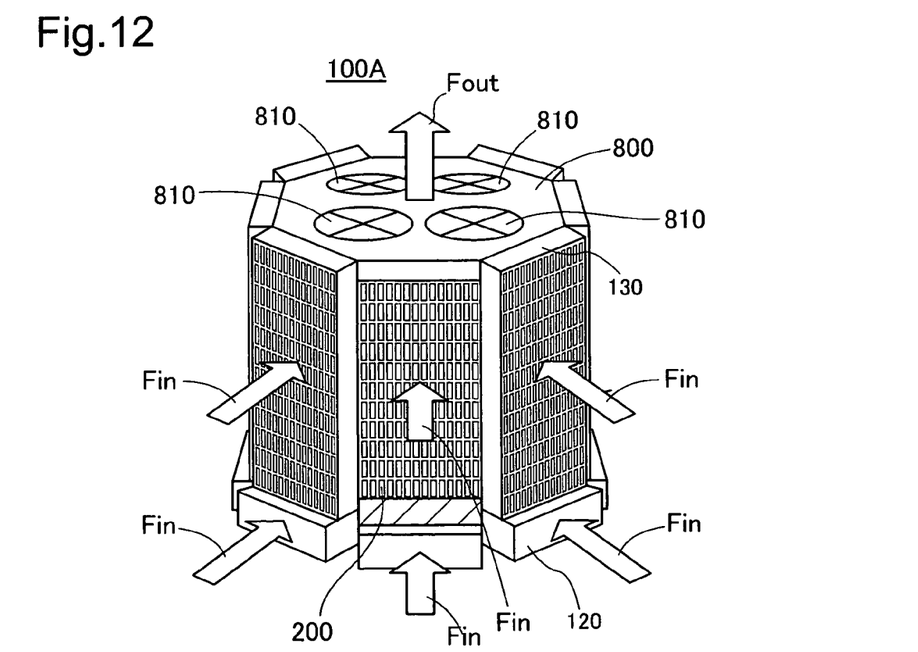
FIG. 12 shows an external perspective view of the storage system pertaining to the second embodiment.
Figure 13:
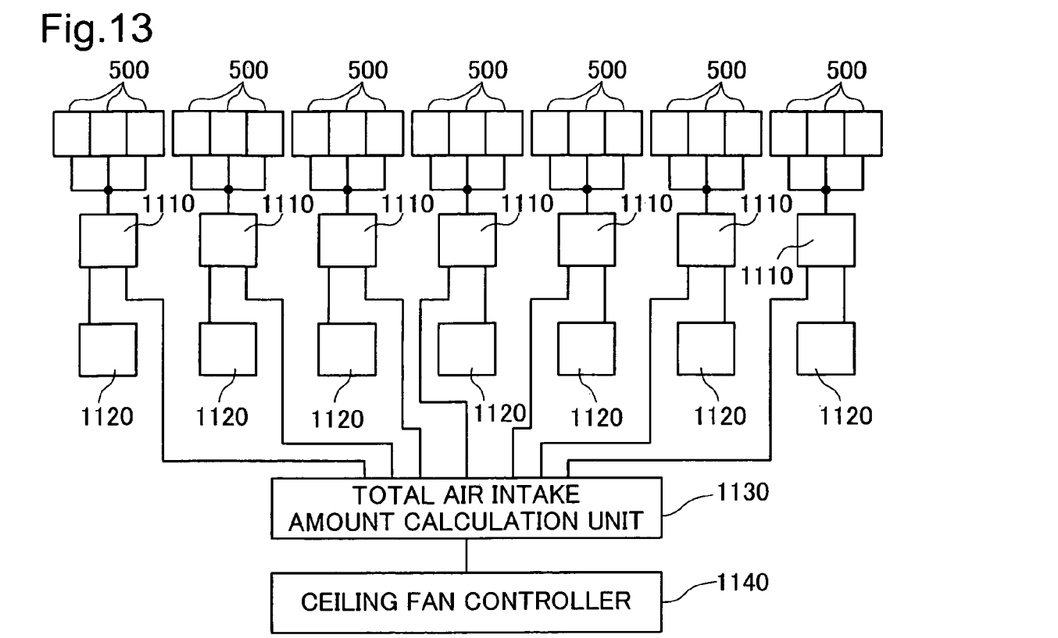
FIG. 13 shows a block diagram of a functional construction to control ceiling fans.

A storage system pertaining to a second embodiment will now be described with reference to FIGS. 11–13. FIG. 11 shows a cross-sectional view of a storage system pertaining to the second embodiment cut along a plane parallel to the installation surface. FIG. 12 shows an external perspective view of the storage system pertaining to the second embodiment. FIG. 13 shows a block diagram of a functional construction to control ceiling fans. In the storage system 100A pertaining to the second embodiment, a construction opposite that used in the storage system 100 pertaining to the first embodiment is employed, i.e., in each enclosure 135 of a given rack 110, the cooling fans 300 are arranged on the interior side of the wiring board 400 and the disk drives 200 are arranged on the exterior side thereof. As a result, the disk drives 200 form a part of the outer surface OP of the rack 110, while the cooling fans 300 form a part of the inner surface IP of the rack 110. Therefore, FIG. 5 described above is equivalent to an external side view of the rack 110 of the second embodiment, and FIG. 6 described above is equivalent to an internal side view of the rack 110 of the second embodiment.

In addition, in the storage system 100A pertaining to the second embodiment, a ceiling 800 is disposed above the central space S, i.e., at the topmost area of the storage system 100A, such that it runs substantially parallel to the top surfaces of the racks 110. The ceiling 800 includes ceiling fans 810. The ceiling fans 810 draw air from inside the central space S and expel it out the top of the storage system 100A.

When the storage system 100A pertaining to the second embodiment is operating, the cooling fans 300, 350 arranged on the interior side of each rack 110 draw air from the outside, thereby forming a cooling air flow that travels through the gaps between the disk drives 200 and the power supplies 500, as shown by the arrows Fin in FIG. 12. This cooling air flow enters the central space S and is then expelled outside the storage system 100A by the ceiling fans 810, as shown by the arrow Fout in FIG. 12.

The control of the ceiling fans 810 will now be described with reference to FIG. 13. In the storage system 110A, each rack 110 includes a drive current detector 1110 and a cooling fan controller 1120. The storage system 100A further includes a total air intake amount calculation unit 1130 and a ceiling fan controller 1140. The drive current detector 1110 is incorporated in the power supply section 120, for example, and is connected to the power supplies 500 (see FIG. 5) of each rack 110. The drive current detector 1110 measures the current supplied to the disk drives 200 from the power supplies 500. The cooling fan controller 1120 is incorporated in the disk drive section 130, for example. The cooling fan controller 1120 is connected to the drive current detector 1110 and the current value measured by the drive current detector 1110 is input thereto. The cooling fan controller 1120 can thus take into account the activities of the disk drives 200 based on the measured current value. The cooling fan controller 1120 controls the rotation speeds of the cooling fans 300, 350 in accordance with the activity of the disk drives 200.

The total air intake amount calculation unit 1130 and ceiling fan controller 1140 are incorporated in the controller unit 101, for example. The current value measured by the drive current detector 1110 of each rack 110 is input to the total air intake calculation unit 1130 as well as to the cooling fan controller 1120. The total air intake amount calculation unit 1130 detects the activities of the cooling fans 300, 350 for each rack 110 from the input current values. The total air intake calculation unit 1130 then calculates the amount of air drawn into the central space S based on the activities of the cooling fans 300, 350 and notifies the ceiling fan controller 1140 of the result of this calculation. The ceiling fan controller 1140 controls the rotation speeds of the ceiling fans 810 such that the amount of air expelled from the ceiling fans 810 equals the amount of air taken into the central space S.

According to the storage system 100A pertaining to the second embodiment having the above construction, the same operation and effect as that obtained with the first embodiment may be obtained. In other words, the storage system 100A enables good cooling performance while improving packaging density and maintainability.

C. Third Embodiment

Figure 14:
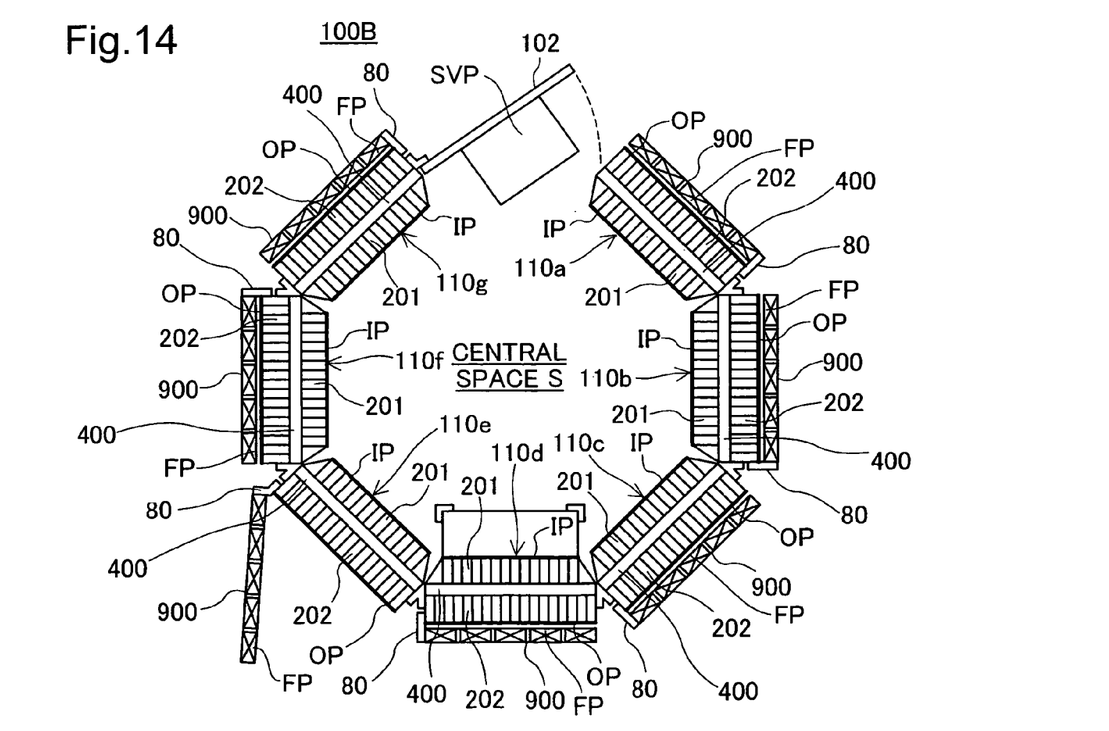
FIG. 14 shows a cross-sectional view of the storage system pertaining to a third embodiment cut along a plane parallel to the installation surface.
Figure 15:
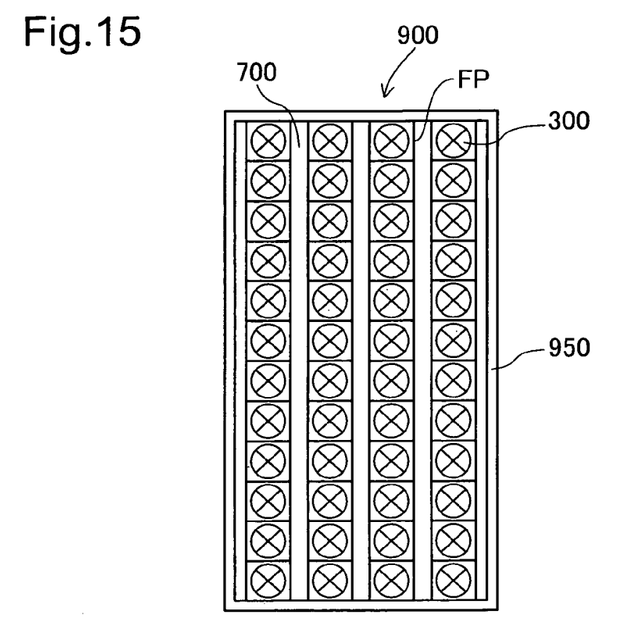
FIG. 15 shows a side view of a door seen from a perspective facing a rack 110.
Figure 16:
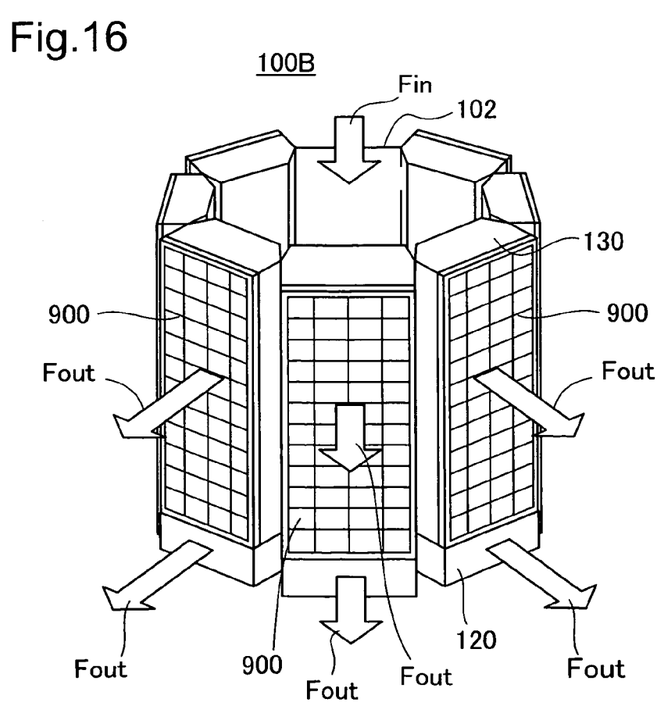
FIG. 16 shows a first perspective view of the exterior of the storage system pertaining to the third embodiment.
Figure 17:
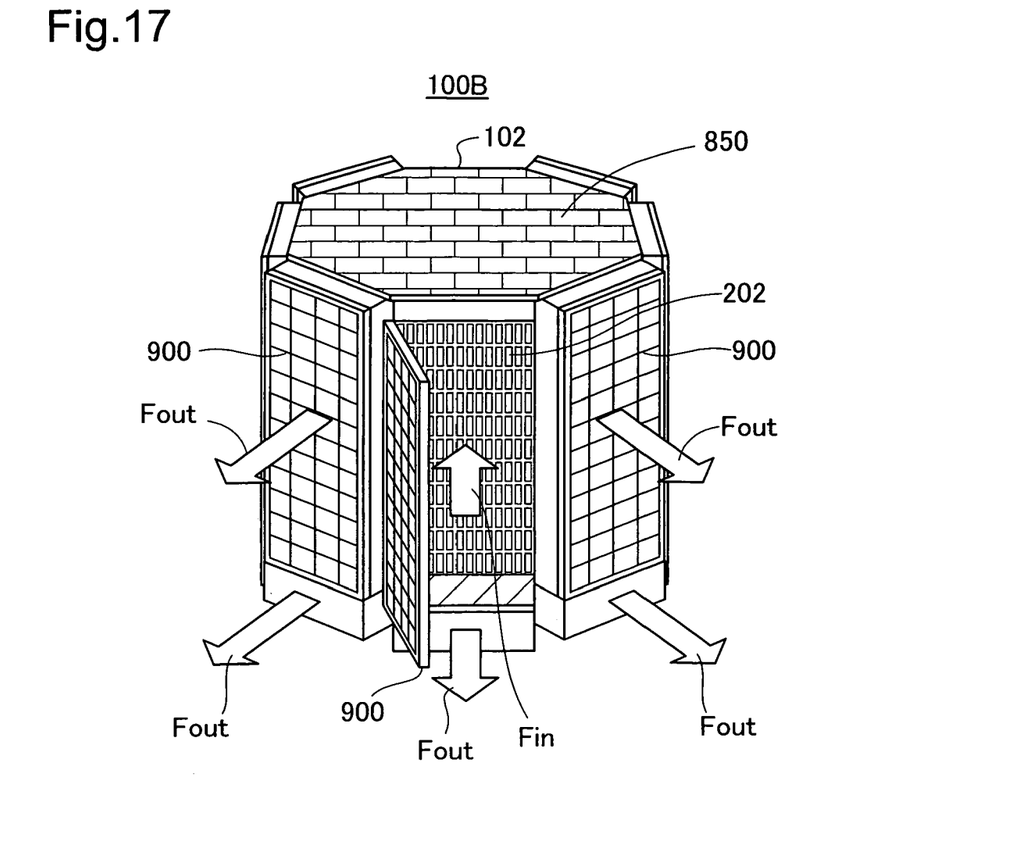
FIG. 17 shows a second perspective view of the exterior of the storage system pertaining to the third embodiment.

A storage system pertaining to a third embodiment will now be described with reference to FIGS. 14–17. FIG. 14 shows a cross-sectional view of the storage system pertaining to a third embodiment cut along a plane parallel to the installation surface. FIG. 15 shows a side view of a door seen from a perspective facing a rack 110. FIG. 16 shows a first perspective view of the exterior of the storage system pertaining to the third embodiment. FIG. 17 shows a second perspective view of the exterior of the storage system pertaining to the third embodiment.

In the storage system 100B pertaining to the third embodiment, first disk drives 201 are arranged on the interior side of the wiring board 400 in each rack 110, while second disk drives 202 are arranged on the exterior side of the wiring board 400. As a result, the first disk drives 201 form a part of the inner surface IP of the rack 110, while the second disk drives 202 form a part of the outer surface OP of the rack 110. Therefore, both a side view of the rack 110 of the third embodiment viewed from the interior side and a side view of the rack 110 of the third embodiment viewed from the exterior side resemble the side view shown in FIG. 5 described above. However, as shown in FIG. 14, a horizontal cross-sectional view of each rack 110 cut along a plane parallel to the installation surface shows that the section on the interior side of the wiring board 400 has a substantially trapezoidal configuration. As a result, where multiple racks 110 are arranged in a substantially polygonal configuration, adjacent racks 110 do not collide with each other at the inner corners. Due to this configuration of the racks 110, the number of second disk drives 202 that can be assembled on the exterior side of the wiring board 400 is larger than the number of first disk drives 201 that can be assembled on the interior side. As a result, the packaging density of the disk drives 201, 202 can be further increased. Furthermore, as in the first embodiment, cooling fans 350 are disposed on the exterior sides of the power supply sections 120 (see FIG. 6).

Furthermore, a door 900 is mounted to each rack 110 of the storage system 100B pertaining to the third embodiment. The door 900 is mounted via a hinge 80 at the edge of the outer surface OP of each rack 110 such that the door 900 may be openable and closable. The door 900 faces the outer surface OP of the rack 110 to which it is mounted such that it runs substantially parallel thereto.

Each door 900 includes a frame 950, multiple cooling fans 300 and a protective cover 700. As seen in FIG. 15, multiple cooling fans 300 are arranged within the frame 950, and as a result, the front surface FP of the door 900 is formed by the cooling fans 300. The front surface FP of the door 900 is a surface that when the door 900 is closed faces and runs substantially parallel to the outer surface OP of the rack 110 to which the door 900 is mounted, as shown in FIG. 14. The protective cover 700 is identical to the protective cover 700 described in connection with the first embodiment, and is mounted to the side of the door 900 opposite the front surface FP.

When all of the doors 900 are closed as shown in FIG. 16, the cooling fans 300 incorporated in the doors 900 and the cooling fans 350 incorporated in the power supply sections 120 draw air from the central space S and form a cooling air flow that travels through the gaps between the disk drives 201, 202 and the power supplies 500. After this cooling air flow travels through the gaps between the disk drives 201, 202 and the power supplies 500 as indicated by the arrows Fout in FIG. 16, it is expelled outside the racks 110. As in the first embodiment, because the air inside the central space S is expelled outward as cooling air flow, air enters the central space S through the opening in the top surface of the storage system 100B formed at the top of the central space S, as indicated by the arrow Fin in FIG. 16.

When the storage system 100B is running while one or more of the multiple doors 900 is open, as shown in FIG. 17, a cover 850 is mounted to the storage system 100B and the entrance/exit door 102 mounted to the ingress/egress opening to the central space S is closed. The cover 850 is mounted such that it covers the opening at the top of the storage system 100B formed above the central space S, and controls the flow of air into and out of the central space S from above. The cover 850 may be either (i) formed to have a certain amount of weight and rest on top of the storage system 100B or (ii) formed to be relatively lightweight and be secured to the storage system 100B using some sort of securing means. The cover 850 need not completely prevent the flow of air, and may comprise a cloth or vinyl sheet or some other type of cover that restricts air flow to a certain extent.

Cooling by the cooling fans 300 cannot be ensured for a rack 110 whose door 900 is open as shown in FIG. 17. However, the cooling air flow is expelled from other racks 110 whose doors 900 are closed, as indicated by the arrows Fout in FIG. 17, and the entry of air into the central space S from above is restricted by the cover 850. As a result, air is drawn into the central space S from the outer surface OP of the rack 110 whose door 900 is open, as indicated by the arrow Fin in FIG. 17. Therefore, even where one or more of the multiple doors 900 of the storage system 100B is open, the cooling of the disk drives 201, 202 of the racks 110 whose doors 900 are open can continue. From the standpoint of minimizing energy consumption, it is not desirable to leave the cooling fans 300 operating while the door 900 to which they belong is open. Therefore, where a door 900 is open, it is preferred that the operation of the fans 300 installed in that door 900 be suspended by including a fan power supply switch linked to the opening and closing of the door 900 such that when the door 900 is open, the rotation of the cooling fans 300 in that door 900 is suspended.

According to the storage system 100B pertaining to the third embodiment having the above construction, because the disk drives 201, 202 are arranged in two rows in the depth-wise direction of each rack 110, the packaging density of the disk drives can be further increased. Moreover, the first disk drives 201 can be easily installed and removed from the interior side of each rack 110, i.e., from the central space S. Furthermore, the second disk drives 202 can be easily installed and removed from the exterior side of each rack 110 by opening the door 900. In addition, because the cooling fans 300 are arranged in each door 900, the cooling fans 300 as well can be easily maintained. Therefore, the storage system 100B offers superior maintainability and serviceability.

Even when one or more of the doors 900 is open in order to carry out maintenance of the second disk drives 202, the cooling of the disk drives 201, 202 of the racks 110 whose door 900 is open can be continued through the installation of a cover 850. Moreover, each of the second disk drives 202 is located close to one of the cooling fans 300. The first disk drives 201 are farther away from the cooling fans 300 than the second disk drives 202 by the amount of the second disk drives 202 in between. However, they are still closer to the cooling fans than the lower-tier disks in the disk device in prior art described above having disk drives disposed in three or more vertical tiers, for example. Therefore, the cooling performance of this embodiment with respect to the disk drives 201, 202 is superior.

D. Variations

The number of the multiple racks 110 is not limited to seven as described in connection with the above embodiments. As described above, by adjusting the angles of the hinges comprising the connecting members 50 and positioning the racks 110 accordingly, a different number of racks 110 can be arranged in a substantially polygonal cylinder configuration. As can be seen from the graph in FIG. 10, where the number of racks 110 ranges from 3 to 10, the storage system 100 of the embodiments requires a smaller footprint than that required when the racks of the conventional art are used. As can also be seen from the graph in FIG. 10, the footprint reduction effect is particularly noticeable when the number of racks 110 in the storage system 100 of the embodiments ranges from 5 to 8.

In the third embodiment, the doors 900 are mounted to the exterior sides of the racks 110, but they may instead be mounted to the interior sides thereof. In this case, when a maintenance task such as disk drive replacement is to be performed to the first disk drives 201 arranged on the interior side of a rack 110, the door 900 for that rack is opened. Furthermore, even where the doors 900 are mounted to the interior sides of the racks 110, when one or more of the doors 900 is in an opened state, the cooling of the disk drives contained in the racks 110 whose door 900 is open can be continued through the installation of a cover 850. In this case, air is expelled from the central space S through the racks 110 whose door 900 is open.

The dimensions of the racks 110 described above and the numbers of disk drives 200, 201, 202 and cooling fans 300 housed in each rack 110 were provided as examples only, and the present invention is not limited thereto. For example, these dimensions and numbers of disk drives and cooling fans housed in each rack may be changed as appropriate in accordance with the sizes of the disk drives 200 and power supplies 500 used in the storage system 100 of the first embodiment and the required storage capacity for the storage system 100 or other factors. While each rack 110 pertaining to the first embodiment had a width of approximately 500 mm, it is preferred that this widthwise dimension be set taking into account the construction of the installed flooring and sub-flooring. For example, commonly used floor panels of raised floor comprise square panels measuring approximately 500 mm on each side. Therefore, if the width of each rack 110 is set to a value 500 mm or higher, the weight of one rack 110 can be distributed across multiple floor panels. Conversely, if the racks 110 are excessively wide, the volume of the central space S becomes larger than necessary, thereby reducing the disk drive packaging density. When these factors are considered, the preferred width of each rack 110 ranges from approximately 500 mm to approximately 700 mm.

Figure 18:
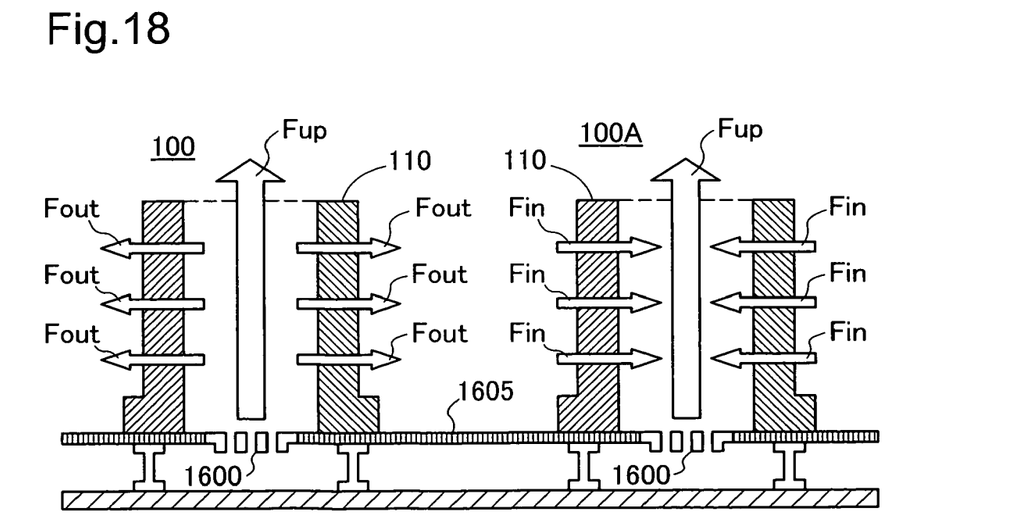
FIG. 18 shows a schematic of one example of the installation of the storage system.

Furthermore, the cooling performance of the storage system 100 described above may be further improved by making various changes in the installation method therefor. FIG. 18 shows a schematic of one example of the installation of the storage system. In FIG. 18, a storage system 100 and storage system 100A installed on a so-called raised floor are shown 1605. FIG. 18 shows a cross-sectional view of the storage systems 100, 100A cut along a plane perpendicular to the installation surface together with a cross-sectional view of the raised floor 1605. In a room having the raised floor 1605 shown in FIG. 18, a ventilation system in which air is blown upward from the floor is used, and as shown in FIG. 18, the air flow outlets 1600 of the ventilation system are disposed in the raised flooring. Cooling air flow travels upward from each air flow outlet 1600 as indicated by the arrows Fup. In FIG. 18, the storage systems 100 and 100A are installed such that their central spaces S are positioned over the air flow outlets 1600. In the storage system 100, the cool air blown upward from the air flow outlet 1600 is expelled via the cooling fans 300 incorporated in each rack 110 (see the arrows Fout in FIG. 18). In this case, a better cooling effect can be obtained than in the situation where non-cooled air is drawn in from above. In the storage system 100A, air is pulled into the central space S from an external area (see the arrows Fin in FIG. 18). In this case, because the air drawn into the central space S is blown upward by the air flow from the air flow outlet 1600, the ceiling 800 and ceiling fans 810 may be omitted.

The storage system of these embodiments is not limited to the data backup use described in connection with FIG. 1. It may be connected to a host computer and used as a primary storage system. Furthermore, any type of construction may be used for the functional construction of the storage system 100, including the internal construction of the controller unit 101. For example, a disk controller DKC incorporating disk adapters and channel adapters was described above with reference to FIG. 8, but a disk controller DKC having a different construction may be used instead. For example, a disk controller that executes disk adapter and channel adapter processing using a single controller may be used, or a disk controller that has independent processors for the channel adapters and disk adapters, and in which the connections between the various interfaces and processors are made via switches, may alternatively be used.

While the storage system pertaining to the invention have been shown and described on the basis of the embodiment and variation, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A storage system comprising:
    multiple racks that are arranged to form a substantially polygonal cylinder-shaped central space and have an entrance area, wherein each of the multiple racks has an inside and an outside, wherein the central space is used to enable maintenance work to be carried out, wherein the entrance area for a worker to enter the central space is formed between a first rack and a second rack among the multiple racks;
    multiple disk drives that are detachably mounted to one side of the inside and the outside of the multiple racks, wherein the multiple disk drives are arranged to form a first surface of each of the multiple racks; and
    multiple cooling devices that are arranged to form a second surface of each of the multiple racks, wherein the second surface is substantially parallel to the first surface.

2. A storage system according to claim 1 further comprising
    connectors that connect two adjacent racks among the multiple racks.

3. A storage system according to claim 1, wherein
    the number of the multiple racks ranges from 3 to 10.

4. A storage system according to claim 1 further comprising
    one or more power supplies that are arranged in at least one of the multiple racks, wherein the one of more power supplies is at a height different from a height of the disk drives and provides electric power to the disk drives.

5. A storage system according to claim 1,
    wherein the first surfaces are inner surfaces that define the substantially polygonal cylinder-shaped central space,
    wherein the second surfaces are outer surfaces on the side opposite to the inner surfaces, and
    wherein the cooling devices provide air flow from the inside to the outside of the multiple racks.

6. A storage system according to claim 1,
    wherein the second surfaces are inner surfaces that define the substantially polygonal cylinder-shaped central space,
    wherein the first surfaces are outer surfaces on the side opposite to the inner surfaces, and
    wherein the cooling devices provide air flow from the outside to the inside of the multiple racks.

7. A storage system according to claim 1, wherein
    the storage system is installed such that the central space is positioned at an air flow outlet of a ventilation apparatus by which air is blown upward from a floor.

8. A storage system according to claim 6 further comprising
    an exhaust device arranged above the central space, wherein the exhaust device expels air sent to the central space by the cooling devices.

9. A storage system according to claim 8, wherein
    an output from the exhaust device is adjusted in accordance with an activity of the cooling devices.

10. A storage system comprising:

multiple racks that are arranged to form a substantially polygonal cylinder-shaped central space and have an entrance area, wherein each of the multiple racks has an inside and an outside, wherein the central space is used to enable maintenance work to be carried out, wherein the entrance area for a worker to enter the central space is formed between a first rack and a second rack among the multiple racks;

multiple first disk drives that are detachably mounted to the inside of the multiple racks, wherein the multiple first disk drives are arranged to form an inner surface of each of the multiple racks;

multiple second disk drives that are detachably mounted to the outside of the multiple racks, wherein the multiple second disk drives are arranged to form an outer surface of each of the multiple racks;

multiple doors that are each mounted to one side of the inside and the outside of each of the multiple racks, wherein the multiple doors are openable and closable, wherein when being closed, each of the multiple doors faces and substantially parallel to a mount-side-surface, wherein the mount-side-surface is a surface of the one side to which the door is mounted among the inner surface and the outer surface of the rack; and multiple cooling devices that are arranged to form a door-surface of each of the multiple doors, wherein the door-surface is a surface facing and substantially parallel to the mount-side-surface when the door being closed.

11. A storage system according to claim 10 further comprising
connectors that connect two adjacent racks among the multiple racks.

12. A storage system according to claim 10, wherein the number of the multiple racks ranges from 3 to 10.

13. A storage system according to claim 10 further comprising
one or more power supplies that are arranged in at least one of the multiple racks, wherein the one of more power supplies is at a height different from a height of the disk drives and provides electric power to the disk drives.

14. A storage system according to claim 10 further comprising
a cover that, during operation with at least one of the multiple doors open, covers an opening at the top of the central space at a top surfaces of the multiple racks, wherein the cover prevents air from entering or escaping from the central space from above.

15. A storage system according to claim 10,
wherein the doors are mounted to the outside of the multiple racks, and
wherein the cooling devices provide air flow from the inside to the outside of the multiple racks.

16. A storage system according to claim 10,
wherein the doors are mounted to the inside of the multiple racks, and
wherein the cooling devices provide air flow from the outside to the inside of the multiple racks.

17. A storage system according to claim 10, wherein
the storage system is installed such that the central space is positioned at an air flow outlet of a ventilation apparatus by which air is blown upward from a floor.

18. A storage system according to claim 16 further comprising
an exhaust device arranged above the central space, wherein the exhaust device expels air sent to the central space by the cooling devices.

19. A storage system according to claim 18, wherein
an output from the exhaust device is adjusted in accordance with an activity of the cooling devices.

* * * * *